(12) United States Patent
Kalashnikov

(10) Patent No.: US 11,753,591 B2
(45) Date of Patent: Sep. 12, 2023

(54) DEVICE FOR PYROLYSIS OF CARBONACEOUS MATERIALS AND METHOD

(71) Applicant: Extiel AP, LLC, Dallas, TX (US)

(72) Inventor: Yury Kalashnikov, Dallas, TX (US)

(73) Assignee: Extiel AP, LLC, Dallas, TX (US)

(*) Notice: Subject to any disclaimer, the term of this patent is extended or adjusted under 35 U.S.C. 154(b) by 0 days.

(21) Appl. No.: 17/688,137

(22) Filed: Mar. 7, 2022

(65) Prior Publication Data

US 2022/0282160 A1 Sep. 8, 2022

Related U.S. Application Data

(60) Provisional application No. 63/158,123, filed on Mar. 8, 2021.

(51) Int. Cl.
| | |
|---|---|
| *C10B 19/00* | (2006.01) |
| *B01J 6/00* | (2006.01) |

(Continued)

(52) U.S. Cl.
CPC .............. *C10B 19/00* (2013.01); *B01J 6/008* (2013.01); *B01J 19/0013* (2013.01);
(Continued)

(58) Field of Classification Search
CPC ......... C10B 19/00; C10B 29/02; C10B 45/00; C10B 47/24; C10B 53/02; B01J 19/0013; B01J 19/088; B01J 6/008
See application file for complete search history.

(56) References Cited

U.S. PATENT DOCUMENTS

| | | | |
|---|---|---|---|
| 4,181,504 A | * | 1/1980 | Camacho ................... C10J 3/20 |
| | | | 48/209 |
| 4,255,166 A | | 3/1981 | Gernand et al. |

(Continued)

FOREIGN PATENT DOCUMENTS

| | | |
|---|---|---|
| CN | 108251137 | 7/2018 |
| CN | 109967487 | 7/2019 |

(Continued)

OTHER PUBLICATIONS

Rodriquez, Kari, International Search Report, dated Jul. 25, 2022, International Searching Authority.

*Primary Examiner* — Jonathan Miller
(74) *Attorney, Agent, or Firm* — Brian K. Yost; Decker Jones, PC

(57) ABSTRACT

The device for pyrolysis of carbonaceous materials comprises a working chamber comprising a non-magnetic wall comprising an inner graphite lining; one or more electrodes adapted to be inserted within a carbon-based bedding; a solenoid coiled around the device exterior, the solenoid adapted to create a magnetic field within the working chamber such that when the solenoid is energized, the carbon-based bedding is caused to move; a lower solids outlet comprising an airlock, the solids outlet adapted to permit solids to exit the device; and a lower gas outlet adapted to permit gaseous substances to exit after having traveled through the carbon-based bedding. The method comprises the steps of loading carbon-containing materials into the working chamber; using the first and second electrodes to heat the carbon-containing materials by passing electric current through the carbon-containing materials without air access; collecting, cleaning and releasing gaseous pyrolysis products produced by the heating.

34 Claims, 6 Drawing Sheets

(51) Int. Cl.
    *B01J 19/08* (2006.01)
    *B01J 19/00* (2006.01)
    *C10B 53/02* (2006.01)
    *C10B 29/02* (2006.01)
    *C10B 27/00* (2006.01)
    *C10B 45/00* (2006.01)
    *C10B 47/24* (2006.01)
    *C10B 33/02* (2006.01)

(52) U.S. Cl.
    CPC ............. *B01J 19/088* (2013.01); *C10B 27/00* (2013.01); *C10B 29/02* (2013.01); *C10B 33/02* (2013.01); *C10B 45/00* (2013.01); *C10B 47/24* (2013.01); *C10B 53/02* (2013.01); *B01J 2219/00132* (2013.01); *B01J 2219/086* (2013.01); *B01J 2219/0809* (2013.01); *B01J 2219/0879* (2013.01)

(56) References Cited

U.S. PATENT DOCUMENTS

| | | | | |
|---|---|---|---|---|
| 5,403,991 A * | 4/1995 | Tylko | .................. | C22B 4/005 219/121.36 |
| 5,615,627 A * | 4/1997 | Marr, Jr. | ................ | F23J 15/006 219/68 |
| 5,824,988 A * | 10/1998 | Tylko | ................ | H01J 37/32064 219/121.36 |
| 5,943,970 A * | 8/1999 | Gonopolsky | ........... | C22B 7/001 588/314 |
| 9,370,808 B2 * | 6/2016 | Chalabi | .................... | B09B 3/40 |
| 9,777,159 B2 * | 10/2017 | Horn | ......................... | C10B 7/02 |
| 2009/0020018 A1 | 8/2009 | Capote et al. | | |
| 2009/0200180 A1 * | 8/2009 | Capote | .................... | F23G 5/085 205/744 |
| 2011/0008395 A1 | 4/2011 | Horn et al. | | |
| 2011/0083953 A1 * | 4/2011 | Horn | ....................... | C10B 49/04 201/25 |
| 2011/0022983 A1 | 9/2011 | Salansky et al. | | |
| 2011/0229834 A1 * | 9/2011 | Salansky | .................. | F23C 6/04 431/185 |
| 2013/0000490 A1 | 1/2013 | Katayama et al. | | |
| 2013/0004908 A1 * | 1/2013 | Katayama | ................ | F27B 3/20 432/9 |
| 2014/0016168 A1 | 6/2014 | Gaga | | |
| 2016/0000254 A1 | 1/2016 | Chalabi et al. | | |
| 2022/0282160 A1 * | 9/2022 | Kalashnikov | ........ | B01J 19/0013 |

FOREIGN PATENT DOCUMENTS

| | | |
|---|---|---|
| CN | 110451754 | 11/2019 |
| CN | 210197345 | 3/2020 |
| EP | 3686916 A1 | 7/2020 |
| JP | H0972517 | 3/1997 |
| JP | H09269110 | 10/1997 |
| JP | H11118122 | 4/1999 |
| RU | 2 117 217 | 8/1998 |
| RU | 2 314 455 | 1/2008 |
| RU | 2 370 520 | 10/2009 |
| RU | 2 408 820 | 1/2011 |
| RU | 2 508 280 | 2/2014 |
| RU | 2 524 110 | 7/2014 |
| WO | WO 01/53434 | 7/2001 |
| WO | WO 2019/071335 | 4/2019 |

* cited by examiner

DEVICE FOR PYROLYSIS OF CARBONACEOUS MATERIALS AND METHOD

This application claims the benefit of U.S. provisional patent application Ser. No. 63/158,123 filed Mar. 8, 2021, the contents of which are incorporated by reference herein in their entirety.

BACKGROUND OF THE INVENTION

1. Field of the Invention

The present invention relates generally to processing and recycling of waste and specifically to a device for pyrolysis of carbonaceous materials and method of use.

2. Description of the Prior Art

The processing and recycling of human and animal waste is today one of the main problems requiring immediate solution. Technologies for deep processing of various wastes already exist and are applied commercially, but for improving their profitability, it is necessary to increase their efficiency by producing high-value products out of abundant wastes. An important factor is the environmental footprint of the waste processing technology, as well as the properties of the final products. In this regard, the development of a technology and equipment for producing pure syngas from carbon-containing waste and its further processing into high-value products with the maximum economic effect is an urgent and sought-after task. The syngas obtained as a result of processing waste can be used both to generate electricity and to produce motor fuels, plastic, fertilizers and other highly liquid products.

Existing technologies for utilization of solid landfill waste and wood waste are based on combustion of waste on grates in the presence of air oxygen. The main disadvantages of conventional processes are formation of dioxins (chlorine-oxygen organic compounds), furans ($C_4H_4O$), the presence of fly ash and products of incomplete combustion. Traditional pyrolysis requires the organization of expensive neutralization and filtration of waste gases. Since 80% nitrogen is present in the air, the volumes of waste gases are large. At the same time, heat is generated as a useful product, which is converted into electricity with the help of heat exchange boilers and steam with a relatively low efficiency (about 20%). In traditional pyrolysis, the waste is heated with hot gases generated during pyrolysis through the steel wall of a retort or the wall of continuous furnace. Since the thermal conductivity of the waste is low, it is necessary to significantly overheat the steel wall of the reactor, which leads to its burning out and the need for its frequent replacement.

Other methods of fast pyrolysis of biomass and hydrocarbon-containing products are known. One prior art example is RU Pat. No. 2,524,110 which discloses loading raw materials into a pyrolysis chamber and, using heating elements located inside the pyrolysis chamber, heating the materials, and offloading the resulting vapor-gas mixture and solid product through the holes in the chamber walls. The pyrolysis according to the '110 patent is carried out by a sequence of heat pulses transmitted from heating elements, which are also heated by electrical pulses. The heating elements are placed in the pyrolysis chamber in such a way that its volume is divided into locally heated cells. The source of electric current with an electronic switch is used to power the heating elements, and the duration of the electric pulse is 0.1 sec-1.0 sec. The power of the electric pulse is chosen to raise the temperature of the heating element to 450° C.-500° C. The time interval between the electrical pulses is chosen to let the heating element cool to a temperature of 200-250° C. In Patent No. RU 2,117,217 a method of pyrolysis of carbon-containing materials, includes loading and heat-treating waste in a molten slag bath and subsequent separation of slag and metal melt, as well as flue gas. A disadvantage of these and other prior art pyrolysis devices is that the pyrolysis products contain a high percentage of harmful impurities.

What is needed is a device and method that reduce harmful impurities in pyrolysis products and permit carbon-containing wastes to be processed at relatively low temperatures (approximately 800-1200 C) and organized in such a way that generated liquids and gases pass through a fluidized moving bed layer, decomposing to CO and H2 (syngas).

SUMMARY OF THE INVENTION

A device and method for absolute pyrolysis of carbon-containing materials is presented. The device (sometimes referred to herein as "furnace") and method reduce harmful impurities in pyrolysis products. Carbon-containing materials ("carbonaceous materials") include solid waste such as plant, animal and human activity waste, as well as liquid and gaseous materials. Waste may comprise an organic part of municipal solid waste (MSW) and solid household and industrial waste, vegetable waste, animal waste (manure and bedding material), livestock mortality waste, medical waste, and an organic part of sludge from city sewers.

By way of general overview, the method consists of passing electric current of industrial frequency through a carbon material fluidized moving bed (coke, coal, charcoal, graphite breakage). The fluidized moving bed material is heated to a temperature sufficient for charring the feedstock coming from above, which then is unloaded in the lower part of the furnace and the fluidized moving bed carbon material layer is replaced by carbonized raw material coming from above. Thus, a continuous pyrolysis process is carried out, in which power of industrial frequency current is applied to the raw material with low conductivity. The gas permeability through the fluidized moving bed where heating occurs is due to the flow of current, and, preferably, there is no melt and no free burning arcs. In the device of the present invention there are, preferably, only micro arcs in the fluidized moving bed layer sparking between pieces of carbon. The heating is carried out due to the flow of current through pieces carbon, which is formed, in part, during the pyrolysis process.

The uploading of raw material into the furnace is carried out through a sealed sluice device and the formed pyrolysis gases are filtered through the layer of fluidized moving bed carbon material heated to a temperature of 800°-1200° C. The raw material is, preferably, granulated in the form of pellets or reduced to wood chips or briquettes. As a result, complex compounds decompose to thermodynamically stable ones in a given temperature range (CO and H2), and water reacts with carbon to the same CO and H2 results. By adjusting the moisture content of the raw material, it is possible to achieve conditions under which virtually all of the generated carbon will react to the level of synthesis gas.

The method of absolute pyrolysis is carried out in a vertical shaft furnace, in the upper part of which there are one or more graphite electrodes connected to an industrial power supply through a matching transformer. The furnace well is lined up with graphite blocks and comprises thermal insulation. The furnace body is made of steel with the possibility of water cooling. In the lower part of the furnace there is an extraction screw for unloading the pyrolysis ash residues and an opening for the syngas outlet.

The material of the furnace body is made of non-magnetic steel and outside of the cylindrical shell of the furnace in the lower zone of the graphite electrodes there is a solenoid coil through which a direct electric current is passed. The interaction of a constant magnetic field created by this current with an industrial frequency current passed through the processed material leads to mechanical vibration of the material being processed, which contributes to better penetration of pyrolysis gases, the absence of stagnant zones, and helps insure uniform heating throughout the furnace. As a result of pyrolysis, syngas is formed with a mole ratio close to 1:1. Part of this gas is converted to electricity with the help of a generator to meet the plant's own needs (this is about 20% of syngas volume), and the rest of the gas is used either to generate additional electrical power, or for the synthesis of Fischer-Tropsch products.

Thus, the device and method of this invention heat carbon-containing waste to a temperature of approximately 800°-1200° C. without access to atmospheric oxygen in order to obtain high quality syngas, while heavy metals (lead, mercury, cadmium, etc.) are reduced to a metallic state, and poisonous products, such as dioxins and furans are formed in minimal amounts and are absorbed by the ash residue.

The quality of syngas (CO+H2) is determined by the following parameters: mole ratio of H2 to CO, the presence of extraneous ballast gases (CO2, H2O, N2, CH4 and other volatile hydrocarbons). Only from sufficiently pure syngas can high-quality products (fuel, alcohols, fertilizers) be further synthesized and used as fuel for generating electricity and heat.

The pyrolysis method of the present invention comprises the steps of feeding the feedstock in the form of pellets through an airlock gateway to the processing zone, charring the feedstock through convection heat transfer when heated to a temperature of 300°-350° C., passing an electric current of industrial frequency through the charred feedstock, while the feedstock is heated to 800°-1200° C., filtering the formed gases and water vapor through a gas-permeable layer of heated carbon residue of the fluidized moving bed, and separating the released gas and ash residue. In this case, vibration and mixing of carbon particles is carried out due to the flow through them. Preferably, an alternating current of industrial frequency with a magnetic field is created by a solenoid on the outside of the furnace hull. The current is supplied using at least one graphite electrode, the power frequency current can be alternating or rectified.

As discussed in more detail below, the device comprises an airlock sluice for feeding raw materials installed in the upper part, a cover with at least one graphite electrode, a graphite furnace well, thermally insulated from the cooled furnace body, a zone for unloading ash residue and releasing syngas. The power transformer and solenoid are installed outside of the graphite electrodes area of current flow.

The start-up of the furnace can be carried out in several ways, the most convenient is the initial loading of granular (lumpy) carbon material (coke, graphite, charcoal) into the cold furnace to a level above the ends of the graphite electrodes as a fluidized moving bed layer, supplying voltage to the working electrodes, heating the contents of the furnace with current, feeding through the sluice device of the feedstock and replacing the pelleted carbon material with the newly formed coke residue during the operation of the unloading extraction screw.

The heating of pelleted carbon material is carried out in a resistive way, while temperatures of several thousand degrees can develop at the boundaries of particle contact with each other, the presence of these temperatures at the boundaries between solid and gaseous matters leads to a more complete decomposition of pyrolysis products to syngas and a more efficient reaction of water vapor with carbon.

In addition to the pyrolysis of solid raw materials, the proposed pyrolysis method allows heating both liquid and gaseous products such as natural gas, oil refining waste and other organic substances. Natural gas is heated without the access of atmospheric oxygen by supplying gas to the upper part of the furnace, the furnace being loaded with carbon material, through which an electric current is passed. This carbon material fluidized moving bed heated by the current decomposes natural gas into hydrogen and carbon black. Carbon black is removed from the furnace with recirculation of pelleted carbon material, as well as in the form of fine particles carried away by the hydrogen flow, which are separated from the hydrogen outside the furnace in a mechanical filter. This process allows hydrogen to be obtained from natural gas without the formation of carbon dioxide, that is, making what is known as "green" hydrogen. The resulting carbon black, which is about 75% of the weight of the feed gas is a valuable feedstock with various applications.

In addition, when using this method, it is possible to reform natural gas by reacting with steam, which is also supplied to the upper part of the furnace. The presence of microarc discharges between the particles of pelleted carbon material, as well as of high-density electric current flowing through the carbon particles, has a catalytic effect and reduces the average temperature of steam reforming, increasing the completeness of the reaction and the yield of syngas. Therefore, there is no need to pre-remove sulfur from natural gas-a traditionally expensive process. Sulfur in this process reacts with carbon to form carbon disulfide, which is very different in properties from syngas and is separated after the reforming process. Syngas is used for the Fischer-Tropsch process to produce synthetic hydrocarbons.

When using liquid hydrocarbons, such as fuel oil and other oil refinery wastes, after they are heated in a furnace to evaporation temperatures, the process of their decomposition and reaction with steam proceeds in the same way as with natural gas.

When organizing the reforming process, the pelleted carbon material can both circulate due to the operation of the lower unloading extraction screw and re-loading through the airlock, and when the pelleted carbon material is on the gas-permeable grid. The grid can be water-cooled.

The device for pyrolysis of carbonaceous materials comprises a base on which a working chamber is installed. The working chamber comprises a housing with an upper end of the housing, a lower end of the housing, an inner surface of the housing and an outer surface of the housing. The housing comprises a graphite lining located on the inner surface of the housing. A cover is part of or mounted on/proximate to the upper end of the housing. First and second electrodes are installed through, or proximate to, the cover and are connected to a power source. The first and second electrodes are located inside the working chamber in the processing zone, which also includes a loading gate, proximate to the zone for loading carbonaceous materials and coupled with the housing in the area of the upper end of the housing. The device also contains an unloading screw which may be part of a module for unloading pyrolysis products with a zone for unloading pyrolysis products. These are connected to the housing at the lower the end of the housing.

There is an option in which the module for unloading pyrolysis products is made in the form of a module body with an upper end of the module body, a lower part of the module body, and an inner part of the module body. In this case, an unloading auger is installed in the lower part of the module body. The module for unloading pyrolysis products includes a collector for collecting gaseous pyrolysis products located in the area of the upper end of the module body and formed by a cavity between the inner part of the module body and a ring adjacent to the base. The collector for collecting gaseous pyrolysis products is connected to the module for the release of gaseous pyrolysis products and has a grate made in a ring.

There is also a variant in which a cooling module is inserted into the module for the release of gaseous pyrolysis products.

There is also a variant in which a vacuum module is introduced into the module for the release of gaseous pyrolysis products.

There is also a variant in which an analyzer of the composition of gaseous pyrolysis products is introduced into the module for the release of gaseous pyrolysis products.

There is also an option in which the working chamber is connected to the pyrolysis products unloading module by means of a base made in the form of a washer, to which the housing is connected by the lower end of the housing and the module body by the upper end of the module body, and the base is mounted on the weight sensors by means of racks.

There is also a variant in which a third electrode is inserted into the device and connected to a power source.

There is also a variant in which a solenoid is located on the outer surface of the housing.

There is also a variant in which a module for mechanical vibration of the electrodes is introduced into the device.

There is also a variant in which a module of mechanical vibration of the working chamber with a second drive, coupled with the housing, is introduced into the device.

There is also a variant in which a water vapor supply module is introduced into the device, installed in the area of the upper end of the housing.

There is also a variant in which a mixing module with a third drive is inserted into the device, installed in the module for unloading pyrolysis products.

There is also a variant in which a thermocouple module is inserted into the device, installed in the first housing in the processing zone.

In certain embodiments of the method of pyrolysis of carbon-containing materials, including loading carbon-containing materials into the working chamber, heat treatment of carbon-containing materials without air access when passing current through carbon-containing materials using the first electrode and the second electrode, collecting, cleaning and neutralizing gaseous products pyrolysis, as well as the unloading of solid pyrolysis products, the temperature treatment of carbon-containing materials is carried out at a temperature not exceeding the melting temperature of carbon-containing materials, while maintaining their gas permeability, while the collection of gaseous pyrolysis products is carried out after passing them through the module for unloading pyrolysis products.

There is a variant in which pyrolysis occurs in a magnetic field.

There is also a variant in which a direct current is used as the current between the first electrode and the second electrode.

In certain embodiments, an alternating current is used as the current between the first electrode and the second electrode.

In other embodiments, an alternating current of power frequency is used as the current between the first electrode and the second electrode.

In certain embodiments, during the thermal treatment of carbon-containing materials, their first mechanical vibration is created due to the interaction of alternating current with a magnetic field.

In certain embodiments, during the temperature treatment of carbon-containing materials, their second mechanical vibration is created due to the vibration of the first electrode and the second electrode.

In certain embodiments, during the thermal treatment of carbon-containing materials, their third mechanical vibration is created by supplying acoustic vibrations at the resonant frequency of the working chamber volume.

As discussed herein, there can be one electrode and a graphite well of the furnace or two or three electrodes. In addition, there can be alternating or direct current between the electrodes. In embodiments with a direct current between the electrodes, the solenoid current is preferably alternating. As this arrangement can cause losses in the device body due to eddy currents, the most efficient arrangement is with three electrodes with three-phase alternating current and direct current for the solenoid. With a direct current in the solenoid and an enclosed case made of non-magnetic material, there are no losses of induction of a constant magnetic field and no eddy losses. When an alternating three-phase current flows through the electrodes, the currents of different phases interact with each other and vibration occurs. The external constant magnetic field enhances this effect. Interaction occurs not only with the current of adjacent phases, but also with the constant magnetic field of the solenoid. A three-phase current has the property of a traveling electromagnetic wave, and when the phase sequence changes, this direction of rotation of the traveling wave changes to the opposite. When using a fluidized moving bed, the presence of vibration and slow rotation of the entire bed ensures uniform heating and homogenization of the thermal field and is an important condition for combating stagnant zones and ensures better gas permeability. The vibration also helps clean the electrodes from the formed pyrolytic carbon resulting from the abrasive properties of the fluidized moving bed. In addition, the use of a three-phase power system allows balancing the load on the AC network and providing a higher power density.

In certain embodiments, the purification and neutralization of gaseous pyrolysis products is carried out by passing them through the processed carbonaceous material.

In certain embodiments, the moisture content of carbon-containing materials is controlled by supplying water vapor to the loading zone of carbon-containing materials.

In certain embodiments, the solid pyrolysis products are mixed in the pyrolysis product discharge zone.

In certain embodiments, the electrodes are supplied with alternating current and the solenoid is supplied with direct current.

In certain embodiments, the inlet and outlets comprise double sluice gates.

In certain embodiments, the electrodes are axially positioned within the working chamber.

In certain embodiments, the solenoid is positioned adjacent to a reaction zone of the chamber.

In certain embodiments, an auger screw is positioned beneath the furnace to withdraw material residue beneath the bedding.

In certain embodiments, syngas exits through the lower gas outlet.

In certain embodiments, the device comprises a water injection device.

In certain embodiments, the device comprises a frame comprising load sensors.

In certain embodiments, the magnetic field is oscillating,

In certain embodiments, an external water jacket is adapted to cool the furnace.

In certain embodiments, plasma enhanced chemical reactions (PECR) occur throughout the reaction zone such that fluidization of the bedding creates and breaks electrical pathways initiating sparks between particles, tiny plasma fields, that act directly on chemical bonds of evolved gases as they pass through the bedding.

In certain embodiments of the method, the feedstock is wood, or waste in the form of refuse derived fuel or RDF (cardboard, plastic, leather, paper, pieces of wood and other household waste), which is initially non-conductive. These wastes are heated from the upper zone of the device, and the current flows through the carbon at the bottom (first through the fluidized moving bed, and then on its own) and gradually the waste itself is charred and becomes a carbon conductor heated to a desired temperature (approximately 800-1200° C.).

In certain embodiments of the method, the device is loaded with coke pieces, and the electric current flows through these pieces, heating the internal volume of the device, a mixture of natural gas and water vapor comes from above. In the result the initial gaseous products of natural gas and water vapor disintegrate into H2+CO or syngas, while the coke fix bed still lies on the grate. Periodically the furnace is reloaded by weight sensors.

In certain embodiments of the method, the feedstock at the inlet is natural gas, at the outlet there is carbon black and hydrogen, that is, gas and solid matter. In order to preserve the working capacity of the device, hydrogen is continuously released, and the coke is unloaded along with the carbon black accumulated on the fluidized moving bed. The coke is then separated from the carbon black and loaded back into the device as much as necessary.

DESCRIPTION OF THE PREFERRED EMBODIMENT

Figure 1:
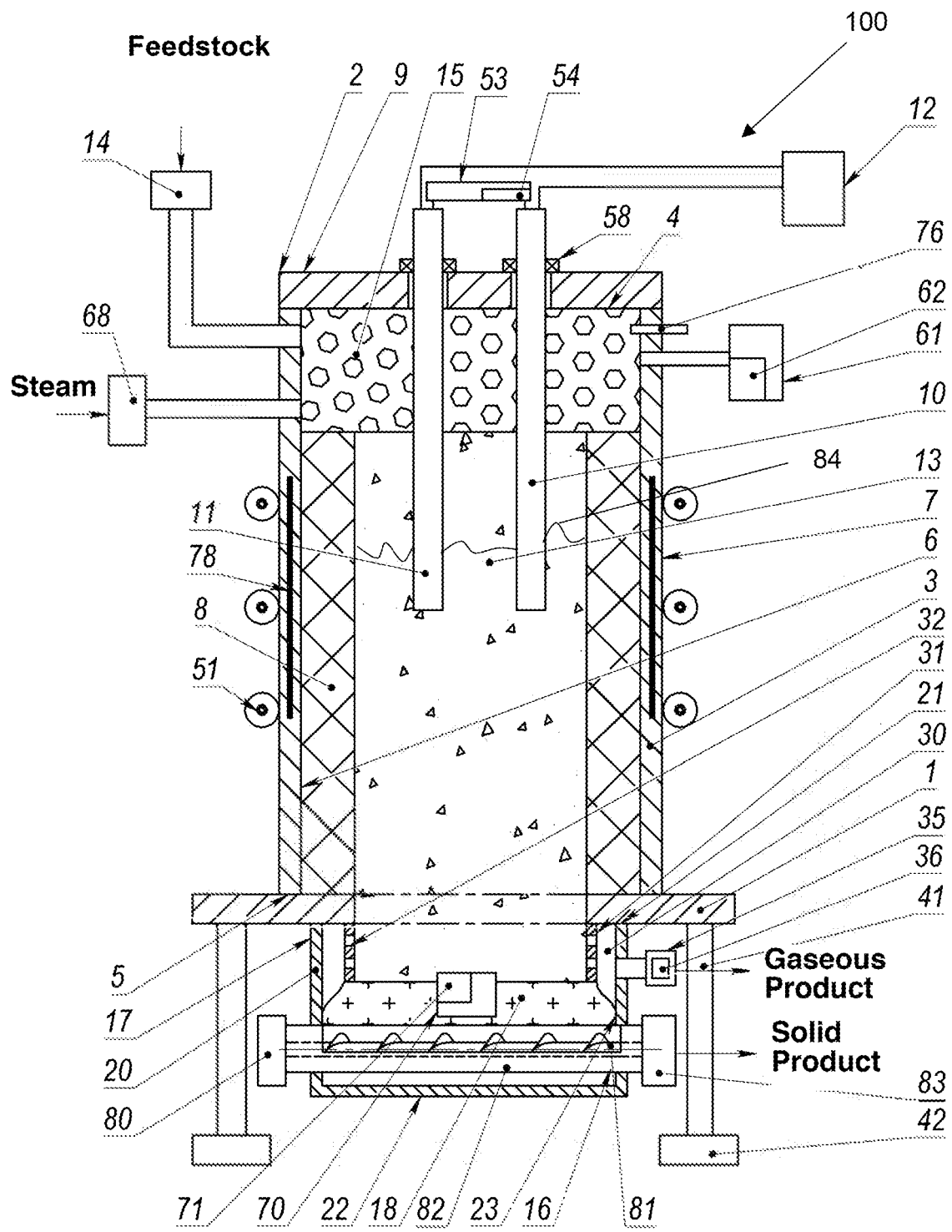
FIG. 1 is a conceptual diagram of the pyrolysis furnace and method of use in accordance with a preferred embodiment.

Referring to FIG. 1, there is shown the device for pyrolysis of carbonaceous materials in accordance with a preferred embodiment. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

By way of general overview, and referring to the figures, the device 100 for pyrolysis of carbonaceous materials of the preferred embodiment generally comprises a base 1 on which a working chamber 2 is installed, including a housing 3 with an upper end 4, a lower end 5, an inner surface 6 and a non-magnetic (e.g., stainless steel) wall 7. The working chamber comprises a graphite lining 8 located on the inner surface 6 of the wall 7. A cover 9 is mounted on the upper end 4. Within the chamber 2 are one or more electrodes 10, 11 electrically connected to a power source 12, the electrodes extending into a processing/reaction zone 13. Carbonaceous feedstock is loaded into the loading gate 14. The solid carbonaceous feedstock is, preferably, granulated in the form of pellets or reduced to wood chips or briquettes. Gaseous products and solid products exit at a lower end of the furnace. A solenoid 51 surrounds the unit.

In operation, a bedding 84 of carbon-based material such as coke, coal, charcoal, or graphite particles is positioned within the chamber 2 to a level above the lower ends of the electrodes 10, 11 such that a portion of the electrodes 10, 11 is embedded in the carbon-based bedding. When the electrodes 10, 11 are energized, the carbon-based bedding 84 acts as a resistive conducting material between the electrodes 10, 11 and the chamber's 2 graphite lining 8 and reaches a pre-determined temperature (approximately 1000 C). The solenoid 51, when energized, creates a magnetic field within the chamber 2. Carbonaceous feedstock is introduced into the chamber through the loading gate which comprises an airlock to prevent exterior air (nitrogen and oxygen) from entering the chamber. The carbonaceous feedstock 15 is heated within the chamber 2 by the heated carbon-based bedding 84, breaking down the carbonaceous feedstock into carbon solids (coke, charcoal, etc.), CO H2 (syngas), minerals and other components. As solids exit through an airlock outlet 83, the bedding 84 is replaced with the now-decomposed feedstock such that a constant level of bedding 84 is maintained. The magnetic field created by the solenoid 51 results in agitation/movement of the bedding 84 materials. This magnetically induced movement of the bedding 84 helps achieve consistent temperatures throughout the bedding 84. Gasses move downward through the bedding 84 and exit at the lower end of the unit. Thus, gas permeability through the carbon-based bedding 84 where heating occurs is due to the flow of current, and, preferably, there is no melt and no free burning arcs. In the device 100 of the present invention there are, preferably, only micro arcs in the carbon-based bedding 84 layer sparkling between pieces of carbon. The heating is carried out due to the flow of current through pieces carbon, which is formed, in part, during the pyrolysis process.

Syngas generated by the unit can be used to provide power to the unit or used as feedstock for production of the products mentioned above. Advantageously, because the pyrolysis process is carried out without supplying oxygen, chlorine-containing components in the waste do not form toxic dioxins. Rather, chlorine is bound by the oxides of ash residues to chlorides.

The base 1 and housing 3 of the preferred embodiment are made of stainless steel 12X18H10T. The graphite lining 8 of the preferred embodiment is made of graphite grade GM 3. The working chamber 2 of the preferred embodiment comprises the first electrode 10 and the second electrode 11 installed in the cover 9, connected to the power source 12 and located inside the working chamber 2 in the processing zone 13. The first electrode 10 and the second electrode 11 can be made in the form of graphite rods with a diameter of 50 mm-100 mm. A transformer and a control cabinet, for example ETTSP 10000/10 can be used as the power source 12. The first electrode 10 and the second electrode 11 are installed in the cover 9 using electrical insulation relative to it, for example, by means of insulators (not shown). The loading gateway 14 is coupled with the loading zone of carbonaceous materials 15 and mated with the housing 3 in the area of the upper end of the housing 4. The loading gateway 14 of certain embodiments is equipped with first and second slide gates (not shown) that open alternately. The working chamber 2 also includes an unloading screw 16. In the preferred embodiment, a module for unloading pyrolysis products 17 is positioned within a zone for unloading pyrolysis products 18 and is connected to the housing 3 in the area of the lower end 5 of the housing 3. This connection can be carried out through the base 1 using a bolted connection. In this case, the unloading screw 16 is located in the pyrolysis products unloading module 17.

The module for unloading pyrolysis products 17 is made in the form of a module body 20 with the upper end of the module body 21, the lower part of the module body 22, the inner part of the module body 23. The module body 20 can be made of 12X18H10T. In the lower part of the module body 22, an unloading auger is installed 16. The module for unloading pyrolysis products 17 includes a collector for collecting gaseous pyrolysis products 30, located in the area of the upper end of the module body 21 and formed by a cavity between the inner part of the module body 23 and a ring 31 adjacent to the base 1 The collector for collecting gaseous pyrolysis products 30 includes a grate 32 made in a ring 31. The grate 32 of the preferred embodiment comprises a perforated cylinder with through openings 5 mm to 15 mm in diameter and a perforation area of 50 to 80%. The collector for collecting gaseous pyrolysis products 30 is connected to the module for the release of gaseous pyrolysis products 35, which in general is a separate unit providing preparation of gaseous pyrolysis products for further use.

In one embodiment, a cooling module 36, which is a tubular heat exchanger, is positioned within the pyrolysis gas outlet 35.

Figure 2:
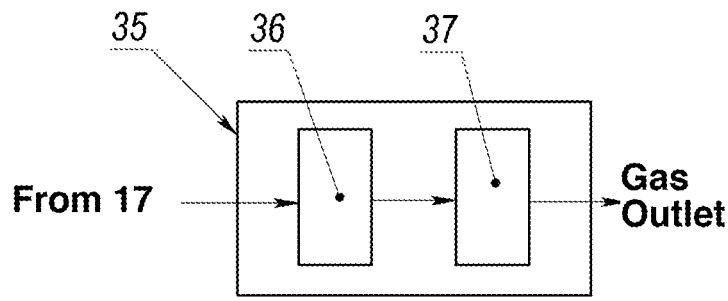
FIG. 2 depicts a module for the release of gaseous pyrolysis products with a vacuum module.

In a preferred embodiment, the module for the release of gaseous pyrolysis products 35 comprises a vacuum module 37 (FIG. 2) comprising a compressor.

Figure 3:
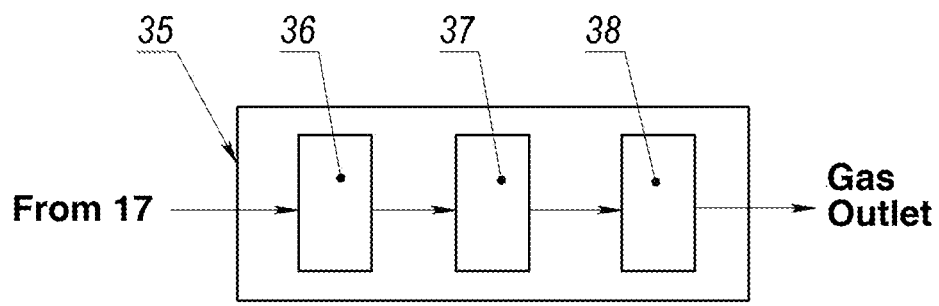
FIG. 3 depicts a module for the release of gaseous pyrolysis products with an analyzer of the composition of gaseous pyrolysis products.

Referring to FIG. 3, in certain embodiments, the module for the release of gaseous pyrolysis products 35 comprises an analyzer of the composition of gaseous pyrolysis products 38 such as a conventional and commercially available chromatograph.

The connection of the working chamber 2 (FIG. 1) with the module for unloading pyrolysis products 17 can be carried out by means of the base 1, made in the form of a washer (a flat torus configuration), to which the housing 3 is connected by the lower end of the housing 5 and the module body 20 by the upper end of the module body 21. Connection of the base 1, made in the form of a washer, with the lower end of the housing 5 and the upper end of the module body 21 can be carried out by welding. The base 1 is mounted by means of racks 41 on load cells 42, which, in the preferred embodiment, are strain gauges (type TENSO-M MV150-S3-15T).

Figure 4:
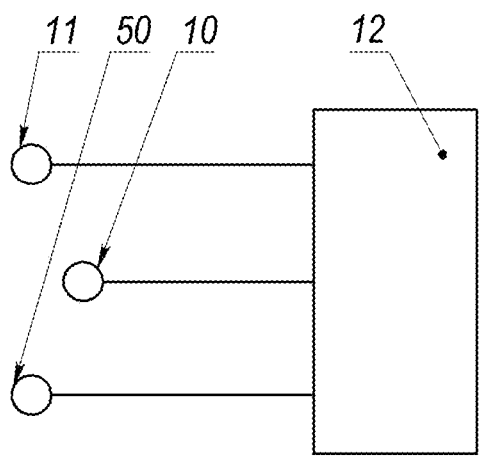
FIG. 4 a variant of the device with three electrodes in accordance with another embodiment.

In one embodiment, a third electrode 50 (FIG. 4) is inserted into the device 100 and connected to a power source 12. The third electrode 50 can be made in the form of a graphite rod with a diameter of 50 mm-1000 mm. In this case, the power supply 12 is a three-phase power supply, for example, ETCP 10000/10.

In one embodiment, on the outer surface 7 of the first housing 3 there is a solenoid 51 (FIG. 1), which is a coil of a copper tube with an inner diameter of 4 mm-16 mm. In this case, the copper pipe is connected to a coolant supply and discharge module (not shown).

In some embodiments, the device 100 comprises a module of mechanical vibration of electrodes 53.

Figure 5:
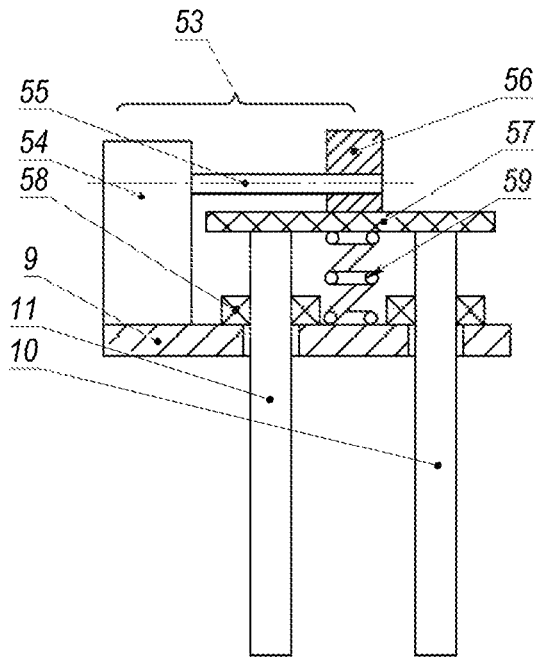
FIG. 5 shows a module of mechanical vibration of electrodes with one eccentric.

In one embodiment, the module of mechanical vibration of the electrodes 53 includes a first drive 54 (FIG. 5), on the first shaft 55 of which the first eccentric 56 is fixed. An induction motor with a frequency converter can be used as the first drive 54. In this case, the first electrode 11 and the second electrode 12 are connected by a plate 57 in interaction with the first eccentric 56. The installation of the first electrode 11 and the second electrode 12 on the cover 9 can be carried out by means of elastic elements 58, which can be stainless steel bellows. The constant pressing of the plate 57 against the first eccentric 56 can be provided by the first spring element 59, which can be made in the form of a coil spring.

Figure 6:
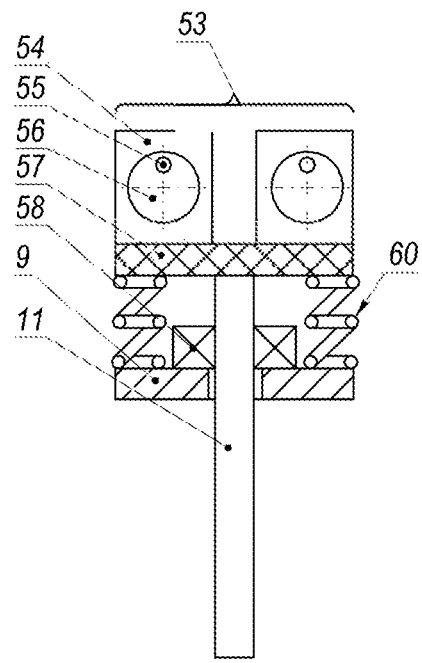
FIG. 6 depicts a module of mechanical vibration of electrodes with two eccentrics in accordance with another embodiment.

In the second version, on the plate 57 (FIG. 6), fixed on the electrode 11 and 12, two first drives 54 with the first eccentrics 56 fixed on the first shafts 55 can be installed. In this embodiment, the first eccentrics 56 are not in contact with the plate 57 The plate 57 can be mounted on the cover 9 on second spring elements 60, which can be in the form of compression springs. Installation of the first electrode 11 and the second electrode 12 on the cover 9 can be carried out by means of elastic elements 58. As the first drive 54, it is also possible to use a commercially available vibration motor, for example (IVF-20-50 produced by JSC Yaroslavl Plant Krasny Mayak).

Figure 7:
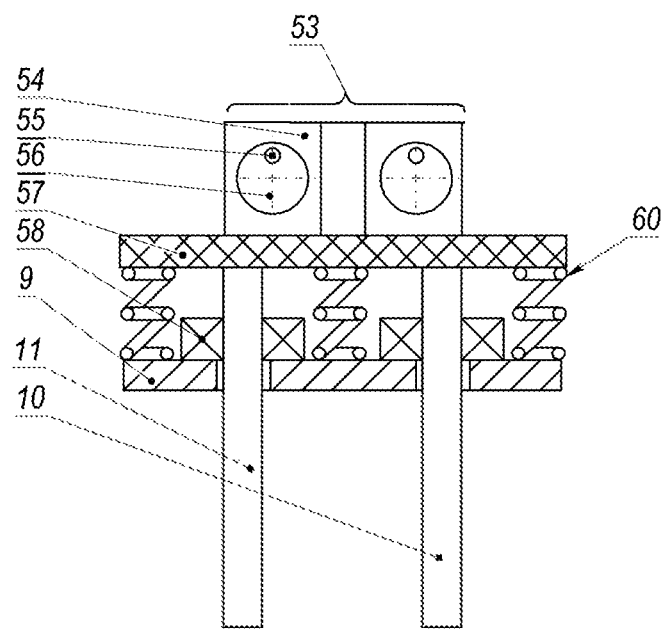
FIG. 7 depicts a module of mechanical vibration of electrodes with two eccentrics in accordance with another embodiment.

In the third embodiment, the plate 57 (FIG. 7), fixed on the first electrode 11 and the second electrode 12, can be equipped with two first actuators 54 with the first eccentrics 56 fixed on the first shafts 55. In this embodiment, the first eccentrics 56 are not in contact with a plate 57. The plate 57 can be mounted on the cover 9 on three second spring elements 60. The installation of the first electrode 11 and the second electrode 12 on the cover 9 can be carried out by means of elastic elements 58, which can be stainless steel bellows.

Figure 8:
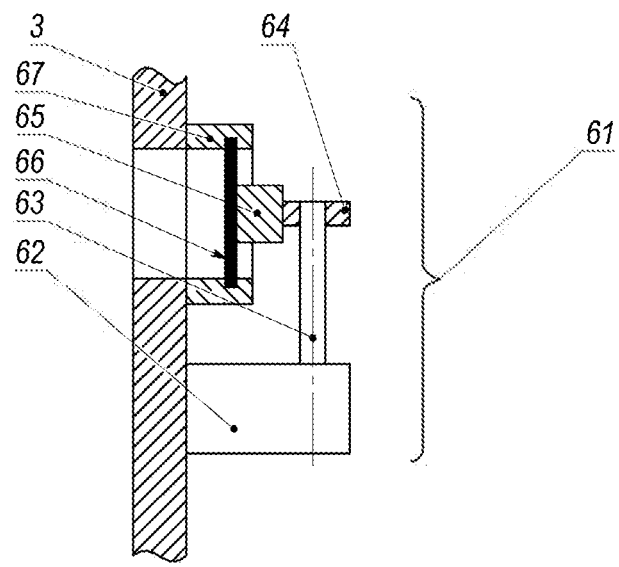
FIG. 8 shows the module of mechanical vibration of the working chamber.

There is a variant in which a mechanical vibration module of the working chamber 61 (FIG. 8) is inserted into the device 100 with a second drive 62, coupled with the housing 3. The second drive 62 is fixed on the housing 3. On the second shaft 63, a second eccentric 64 is attached the possibility of interaction with the pusher 65, which is mated with the elastic membrane 66. As the second drive 62, an induction motor can be used. The elastic membrane 66 can be fixed in the holder 67 installed on the first housing 3. In this case, the elastic membrane can have dimensions of 100 mm-200 mm with a thickness of 0.2 mm-0.5 mm and be made of spring steel.

There is a variant in which a water vapor supply module 68 (FIG. 1) is introduced into the device 100, installed in the area of the upper end of the first housing 4 of the first housing 3. The steam supply module 68 can be configured as a steam generator.

Figure 9:
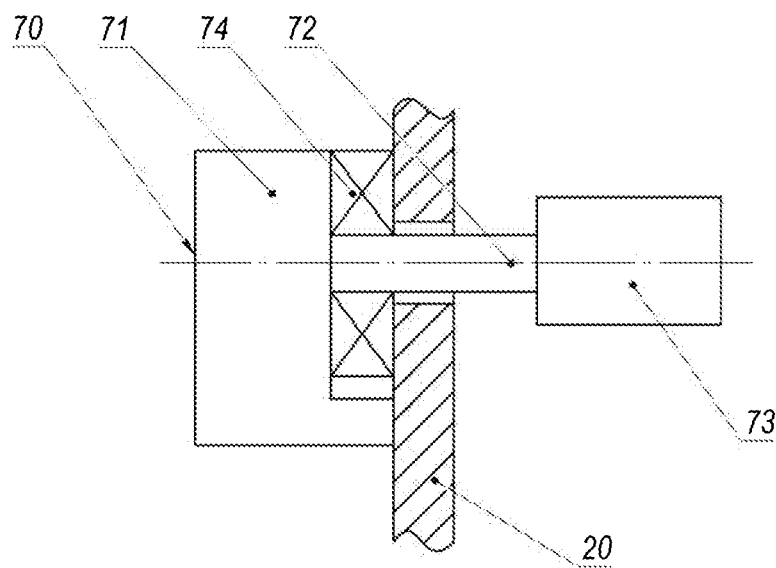
FIG. 9 shows the mixing module.
Figure 10:
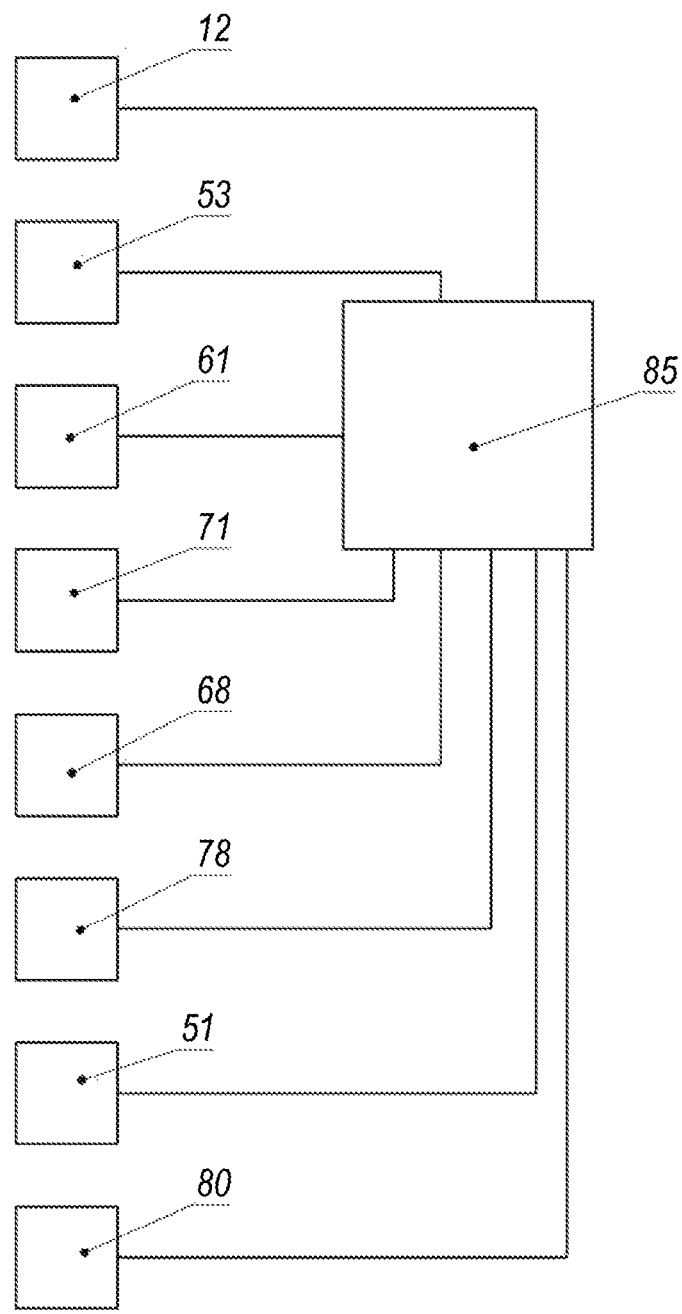
FIG. 10 is a diagram of the connection of functional modules with a control unit.
Figure 11:
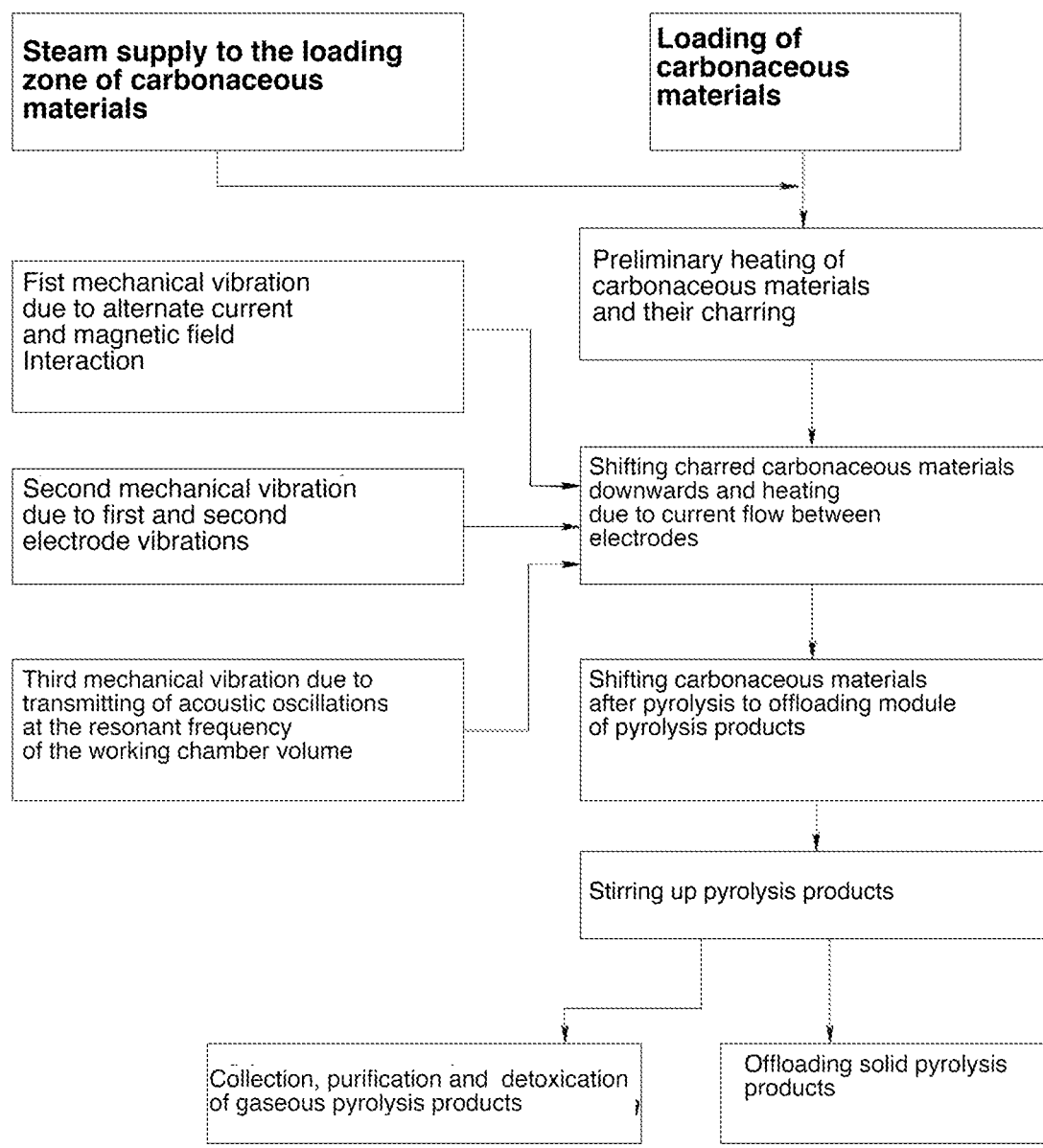
FIG. 11 shows the main stages of the implementation of the method.

There is a variant in which a mixing module 70 is introduced into the device 100, installed in the module for unloading pyrolysis products 15 and made, for example, in the form of a third drive 71 (FIG. 9), on the third shaft 72, which has a turner 73. The third drive 71 is mounted on the second housing 20 using a sealing element 74, such as a gland packing.

Working chamber 2 is equipped with a safety valve 76, which can be used as a knife membrane.

There is a variant in which a thermocouple module 78 is inserted into the device 100 (FIG. 1), installed in the first housing 3 in the processing zone 13. A set of thermocouples mechanically fixed in the body of the first housing 6 can be used as a thermocouple module.

In one embodiment, the unloading auger 16 may include a gear drive with a frequency converter 80 mated with a helical shaft 81 located in an open-top pipe 82 and an associated compaction and unloading module 83.

The method of pyrolysis of carbon-containing materials of a preferred embodiment of the method is implemented as follows. Carry out loading of carbonaceous materials, for example, solid household waste, wood waste, food waste, animal waste and livestock in the working chamber 2. Carbonaceous materials are placed in the loading lock 14 with the first slide gate open and the second slide gate closed (not shown). After that, the first slide gate is closed, the second slide gate is opened and the carbonaceous materials are unloaded. This is necessary to prevent air from entering the working chamber 2. Thereafter, heat treatment of carbon-containing materials is carried out without air access by passing current through the carbon-containing materials using the first electrode 10 and the second electrode 11.

Further, the collection, purification and neutralization of gaseous pyrolysis products, as well as unloading of solid pyrolysis products are carried out. As distinctive features, the temperature treatment of carbon-containing materials is carried out at a temperature not exceeding the melting point of carbon-containing materials in the range 800° C.-1200° C., while maintaining their gas permeability. In the lower part of electrodes 10 and 11, due to the flow of current, a temperature of 800° C.-1200° C. is reached. Newly supplied carbonaceous materials begin to heat up due to heat transfer. When the temperature reaches 100° C.-300° C., partial carbonization of carbon-containing materials occurs. Due to the fact that the unloading screw 16 is continuously operating in the pyrolysis unloading module 17, the carbonized carbonaceous materials continue to descend, and the current begins to flow again through the newly supplied carbonaceous materials, and the process proceeds continuously.

To start pyrolysis, conductive carbon-containing materials, for example, coke, are initially loaded, a current is passed through it, heated and other carbon-containing materials are fed.

In this case, the collection of gaseous pyrolysis products is carried out after passing them through the module for unloading pyrolysis products 17.

There is a variant in which pyrolysis occurs in a magnetic field created by solenoid 51 in the range of 10 mT-100 mT.

There is an option in which a direct current in the range of 50 A-50,000 A is used as the current between the first electrode 10 and the second electrode 11.

There is an option in which an alternating current in the range of 50 A to 50,000 A with a frequency of 10 Hz to 1000 Hz is used as the current between the first electrode 10 and the second electrode 11.

There is an option in which an alternating current of industrial frequency in the range of 50 A-50,000 A is used as the current between the first electrode 10 and the second electrode 11.

There is an option in which, during the thermal treatment of carbon-containing materials, their first mechanical vibration is created due to the interaction of an alternating current flowing through the carbon-containing material to be processed with the magnetic field of the solenoid.

There can be one electrode 11, 12 and a graphite well of the device 100 or two or three electrodes 11, 12. In addition, there can be alternating or direct current between the electrodes 11, 12. In embodiments with a direct current between the electrodes 11, 12, the solenoid current is preferably alternating. As this arrangement can cause losses in the device 100 body due to eddy currents, the most efficient arrangement is with three electrodes 11, 12 with three-phase alternating current and direct current for the solenoid 51. With a direct current in the solenoid 51 and an enclosed case made of non-magnetic material, there are no losses of induction of a constant magnetic field and no eddy losses. When an alternating three-phase current flows through the electrodes 11, 12, the currents of different phases interact with each other and vibration occurs. The external constant magnetic field enhances this effect. Interaction occurs not only with the current of adjacent phases, but also with the constant magnetic field of the solenoid 51. A three-phase current has the property of a traveling electromagnetic wave, and when the phase sequence changes, this direction of rotation of the traveling wave changes to the opposite. When using a fluidized moving bed, the presence of vibration and slow rotation of the entire bed ensures uniform heating and homogenization of the thermal field and is an important condition for combating stagnant zones and ensures better gas permeability. The vibration also helps clean the electrodes 11, 12 from the formed pyrolytic carbon by using the abrasive properties of the fluidized moving bed. In addition, the use of a three-phase power system allows balancing the load on the AC network and providing a higher power density.

There is an option in which, during the temperature treatment of carbon-containing materials, their second mechanical vibration is created due to the vibration of the first electrode 10 and the second electrode 11. There is an option in which during the temperature treatment of carbon-containing materials their third mechanical vibration is created due to the supply of acoustic vibrations from the module mechanical vibration of the working chamber 61 at the resonant frequency of the volume of the working chamber 2 in the range of 10 Hz-100 Hz.

There is an option in which the purification and neutralization of gaseous pyrolysis products is carried out by passing them through the processed carbon-containing material with sorption properties.

There is an option in which the moisture content of carbon-containing materials is adjusted by supplying water vapor to the loading zone of carbon-containing materials 15. The yield of gaseous pyrolysis products increases due to the reaction of water vapor with carbon at temperatures of 800° C.-1200 C.

There is a variant in which the solid pyrolysis products in the pyrolysis product discharge zone 18 are mixed in order to increase gas permeability.

The fact that a module for unloading pyrolysis products 17 is introduced into the device 100, connected to the housing 3 in the area of the lower end of the housing 5, and the unloading screw 16 is located in the module for unloading pyrolysis products 17 leads to a decrease in harmful impurities in gaseous pyrolysis products, due to the fact that all the resulting gaseous pyrolysis products pass through solid pyrolysis products, consisting of the ash residue and residual carbon matter formed in the treatment zone 13. The harmful impurities in the gaseous pyrolysis products, for example, chlorine, hydrogen chloride, sulfur, fluorine, decompose thermally and react with ash residue, which are metal oxides, and are also absorbed on the residual carbonaceous substance.

The fact that the module for unloading pyrolysis products 17 is made in the form of a module body 20 with the upper end of the module body 21, the lower part of the module body 22, the inner part of the module body 23, while the unloading screw 16 is installed in the lower part of the module body 22, and the unloading module pyrolysis products 17 includes a collector for collecting gaseous pyrolysis products 30, located in the area of the upper end of the module body 21 and formed by a cavity between the inner part of the module body 23 and a ring 31 adjacent to the base 1, and the collector for collecting gaseous pyrolysis products 30 is connected to the gaseous products release module pyrolysis 35 and has a grate 32 made in ring 31 leads to a decrease in harmful impurities in the pyrolysis products, due to the fact that the harmful impurities, for example, chlorine, hydrogen chloride, sulfur, fluorine, decompose thermally and react with the ash residue, which is oxides metals, and are also sorbed on residual carbonaceous matter.

The fact that the cooling module 36 is introduced into the module for the release of gaseous pyrolysis products 35 leads to a decrease in harmful impurities in the pyrolysis products, due to the fact that the pressure of the gaseous pyrolysis products, including synthesis gas (which is a mixture of CO and H2), decreases which simplifies the selection of equipment for the subsequent processing of gases.

The fact that a vacuum module 37 is introduced into the module for the release of gaseous pyrolysis products 35 leads to a decrease in harmful impurities in the pyrolysis products, due to the fact that a decrease in pressure leads to a decrease in pressure in the area of the upper end of the first housing 4 and simplifies the removal of gaseous pyrolysis products.

The fact that the analyzer of the composition of gaseous pyrolysis products 38 is introduced into the module for the release of gaseous pyrolysis products 35 leads to the possibility of monitoring technological parameters and allows to optimize the technological process.

The fact that the connection of the working chamber 2 with the module for unloading pyrolysis products 17 is carried out by means of the base 1, made in the form of a washer, to which the housing 3 is connected by the lower end of the housing 5 and the module body 20 by the upper end of the module body 21, and the base 1 by means of racks 41 installed on load cells 42 leads to simplified installation-disassembly and maintenance of the device 100, and weight sensors 42 allow you to optimize the control of the pyrolysis process by monitoring the mass of raw materials inside the furnace.

The fact that a third electrode 50 is inserted into the device 100, connected to a power source 12, leads to a decrease in harmful impurities in the pyrolysis products, due to the fact that it becomes possible to connect a three-phase power source, which increases the power of the device 100 and balances the load on the electrical network.

The fact that a solenoid 51 is located on the outer surface 7 of the first housing 3 leads to a decrease in harmful impurities in the pyrolysis products, due to the fact that when the power frequency current flowing from the electrodes through the workpiece with a constant magnetic field created by the solenoid 51 interacts, mechanical vibration of the workpiece occurs. material, which improves the uniformity of heat treatment of the material and increases the gas permeability of the treatment zone 13.

The fact that a module of mechanical vibration of electrodes 53 is introduced into the device 100 leads to a decrease in harmful impurities in the pyrolysis products, due to the fact that the uniformity of the heat treatment of the processed material is improved and the gas permeability of the treatment zone 13 is increased.

The fact that a mechanical vibration module of the working chamber 61 with a second drive 62 is introduced into the device 100, coupled with the first housing 3, leads to a decrease in harmful impurities in the pyrolysis products, due to the fact that mechanical vibration of the material being processed occurs at the resonant frequency of the internal volume of the working chamber 2, which improves the uniformity of heat treatment of the processed material and increases the gas permeability of the treatment zone 13.

The fact that a water vapor supply module 68 is introduced into the device 100, installed in the area of the upper end of the first housing 4 of the first housing 3, leads to a decrease in harmful impurities in the pyrolysis products, due to the fact that the remaining carbon in the treatment zone 13 reacts with water vapor to form synthesis gas (which is a mixture of CO and H2) in gaseous pyrolysis products, which increases the energy efficiency of processing and the yield of synthesis gas.

The fact that a mixing module 70 installed in the pyrolysis products discharge module 15 is introduced into the device 100 leads to a decrease in harmful impurities in the pyrolysis products, due to the fact that the uniformity of the heat treatment of the processed material is improved and the gas permeability of the treatment zone 13 is increased.

The fact that a thermocouple module 78 installed in the first housing 3 in the processing zone 13 is introduced into the device 100 leads to a decrease in harmful impurities in the pyrolysis products, due to the fact that it becomes possible to control the parameters in the processing zone 13, which makes it possible to optimize the pyrolysis process.

The fact that the temperature treatment of carbon-containing materials is carried out at a temperature not exceeding the melting temperature of carbon-containing materials, while maintaining their gas permeability, leads to the fact that gaseous pyrolysis products freely enter the unloading zone. In this case, the collection of gaseous pyrolysis products is carried out after passing them through the module for unloading pyrolysis products 17.

The fact that pyrolysis occurs in a magnetic field leads to a decrease in harmful impurities in the pyrolysis products, due to the fact that when the power-frequency current flowing from the electrodes through the processed material interacts with a constant magnetic field created by solenoid 51, mechanical vibration of the processed material occurs, which improves uniformity of heat treatment of the material and increases the gas permeability of the treatment zone 13.

The fact that a direct current is used as a current between the first electrode 10 and the second electrode 11, with an alternating magnetic field of the solenoid provides an effective mechanical vibration of carbon-containing materials.

The fact that an alternating current is used as a current between the first electrode 10 and the second electrode 11, with a constant magnetic field of the solenoid provides an effective mechanical vibration of carbon-containing materials.

The fact that an alternating current of industrial frequency is used as the current between the first electrode 10 and the second electrode 11 leads to a simplification of the implementation of the method due to the non-use of expensive generators.

The fact that during the temperature treatment of carbon-containing materials their first mechanical vibration is created due to the interaction of alternating current flowing through the carbon-containing material with a constant magnetic field of the solenoid, leads to an increase in gas permeability and simplification of the withdrawal of gaseous pyrolysis products.

The fact that during the thermal treatment of carbon-containing materials their second mechanical vibration is created due to the vibration of the first electrode 10 and the second electrode 11, leads to a decrease in harmful impurities in the pyrolysis products, due to the fact that the uniformity of the heat treatment of the processed material is improved and the gas permeability of the treatment zone 13.

The fact that during the temperature treatment of carbon-containing materials their third mechanical vibration is created due to the supply of acoustic vibrations at the resonant frequency of the volume of the working chamber 2, leads to a decrease in harmful impurities in the pyrolysis products, due to the fact that at the resonant frequency of the internal volume of the working chamber 2 a mechanical vibration of the processed material, which improves the uniformity of heat treatment of the processed material and increases the gas permeability of the processing zone 13.

The fact that the purification and detoxification of gaseous pyrolysis products is carried out by passing them through the processed carbon-containing material, leads to the fact that harmful gaseous impurities in the form of chlorine, hydrogen chloride, sulfur dioxide gases react with metal oxides found in solid pyrolysis products, binding these gases into non-volatile compounds and also sorbing them on the carbon surface.

The fact that the moisture content of carbon-containing materials is adjusted by supplying water vapor to the loading zone of carbon-containing materials 15 leads to a decrease in harmful impurities in the pyrolysis products, due to the fact that the remaining carbon in the processing zone 13 reacts with water vapor to form synthesis gas (which is a mixture of CO and H2) in gaseous pyrolysis products, which increases the energy efficiency of treatment and the yield of synthesis gas.

The fact that the solid pyrolysis products in the pyrolysis product discharge zone 18 are mixed leads to an increase in the gas permeability of the processed material and an improvement in the uniformity of the heat treatment of the processed material.

In certain embodiments of the method, the feedstock is wood, or waste in the form of refuse derived fuel or RDF (cardboard, plastic, leather, paper, pieces of wood and other household waste), which is initially non-conductive. These wastes are heated from the upper zone of the device 100, and the current flows through the carbon at the bottom (first through the fluidized moving bed, and then on its own) and gradually the waste itself is charred and becomes a carbon conductor heated to a desired temperature (approximately 800-1200° C.).

In certain embodiments of the method, the device 100 is loaded with coke pieces, and the electric current flows through these pieces, heating the internal volume of the device 100, a mixture of natural gas and water vapor comes from above. In the result the initial gaseous products of natural gas and water vapor disintegrate into H2+CO or syngas, while the coke fix bed still lies on the grate. Periodically the furnace is reloaded when weight sensors indicate the furnace is at a predetermined weight.

In certain embodiments of the method, the feedstock at the inlet is natural gas, at the outlet there is carbon black and hydrogen, that is, gas and solid matter. In order to preserve the working capacity of the device 100, hydrogen is continuously released, and the coke is unloaded along with the carbon black accumulated on the fluidized moving bed. The coke is then separated from the carbon black and loaded back into the device 100 as much as necessary.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

I claim:

1. A device for pyrolysis of carbonaceous materials, the device comprising:
   a working chamber, the working chamber comprising a non-magnetic wall comprising an inner graphite lining;
   one or more electrodes adapted to be inserted within a carbon-based bedding positioned within the working chamber, the carbon-based bedding comprising carbonaceous materials;
   the carbon-based bedding being structured and arranged to act as a resistive conductive material between the electrodes and the graphite lining such that the bedding is adapted to be heated by the electrodes when the electrodes are energized by a power supply;

a solenoid adapted to create a magnetic field within the working chamber such that when the solenoid is energized, the carbon-based bedding is caused to move;

a feedstock inlet comprising an airlock, the feedstock inlet adapted to permit feedstock comprising the carbonaceous materials to be introduced into the working chamber without introducing air from an exterior of the device;

a solids outlet comprising an airlock, the solids outlet adapted to permit solids to exit the device; and a gas outlet positioned beneath a level of the carbon-based bedding, the gas outlet being adapted to permit gaseous substances to exit the device after having traveled through the carbon-based bedding.

2. The device for pyrolysis of carbonaceous materials of claim 1, wherein the electrodes are supplied with alternating current and the solenoid is supplied with direct current.

3. The device for pyrolysis of carbonaceous materials of claim 1, wherein the inlet and outlets comprise double sluice gates.

4. The device for pyrolysis of carbonaceous materials of claim 1, wherein the electrodes are axially positioned within the working chamber.

5. The device for pyrolysis of carbonaceous materials of claim 1, wherein the solenoid is coiled around the exterior of the device and is positioned adjacent to a reaction zone of the chamber.

6. The device for pyrolysis of carbonaceous materials of claim 1, further comprising an auger screw positioned beneath the working chamber to withdraw material residue beneath the carbon-based bedding.

7. The device for pyrolysis of carbonaceous materials of claim 1, wherein:

syngas exits through the gas outlet.

8. The device for pyrolysis of carbonaceous materials of claim 1, further comprising one or more ports, the one or more ports being structured and arranged to permit steam, water, or oxygen to be introduced into the working chamber.

9. The device for pyrolysis of carbonaceous materials of claim 1, further comprising a frame comprising load sensors.

10. The device for pyrolysis of carbonaceous materials of claim 1, wherein the magnetic field is oscillating.

11. The device for pyrolysis of carbonaceous materials of claim 1, further comprising an external water jacket adapted to cool the device.

12. The device for pyrolysis of carbonaceous materials of claim 5, wherein plasma enhanced chemical reactions (PECR) occur throughout the reaction zone such that fluidization of the bedding creates and breaks electrical pathways initiating sparks between particles such that plasma fields act directly on chemical bonds of evolved gases passing through the carbon-based bedding.

13. A device for pyrolysis of carbonaceous materials, the device comprising:

a base on which a working chamber is installed;

the working chamber comprising a housing, the housing comprising an upper end, a lower end, an inner surface, and an outer surface;

the housing further comprising a graphite lining located on the inner surface;

the upper end comprising a cover;

the device further comprising first and second electrodes, the first and second electrodes each being installed proximate to the cover and connected to a power source;

the first and second electrodes being located inside the working chamber within a processing zone;

the working chamber comprising a loading gate positioned adjacent to the upper end;

the device further comprising a module for unloading pyrolysis products, the module for unloading pyrolysis products being positioned at the lower end of the housing, the module for unloading pyrolysis products comprising an unloading screw;

the module for unloading pyrolysis products comprising a module body, the module body comprising an upper portion, a lower portion, and an inner portion; the lower portion comprising the unloading screw;

the module for unloading pyrolysis products further comprising a collector for collecting gaseous pyrolysis products, the collector for collecting gaseous pyrolysis products being located at the upper portion of the module body and formed by a cavity between the inner portion and a ring positioned adjacent to the base, the ring comprising a grid;

the collector for collecting gaseous pyrolysis products being connected to a module for releasing gaseous pyrolysis products.

14. The device for pyrolysis of carbonaceous materials of claim 13, wherein the module for releasing gaseous pyrolysis products further comprises a cooling module.

15. The device for pyrolysis of carbonaceous materials of claim 14, wherein the module for releasing gaseous pyrolysis products further comprises a vacuum module.

16. The device for pyrolysis of carbonaceous materials of claim 15, wherein the module for releasing gaseous pyrolysis products comprises an analyzer of the composition of gaseous pyrolysis products.

17. The device for pyrolysis of carbonaceous materials of claim 13, wherein the base comprises a flat torus configuration and connects the working chamber with the module for unloading pyrolysis products such that the housing lower end is connected with the module body upper portion and the base is mounted on load cells by means of struts.

18. The device for pyrolysis of carbonaceous materials of claim 13, further comprising a third electrode inserted within the working chamber and connected to the power source.

19. The device for pyrolysis of carbonaceous materials of claim 13, further comprising a solenoid positioned on the housing outer surface.

20. The device for pyrolysis of carbonaceous materials of claim 13, further comprising a module of mechanical vibration.

21. The device for pyrolysis of carbonaceous materials of claim 13, further comprising a module of mechanical vibration coupled with the working chamber housing.

22. The device for pyrolysis of carbonaceous materials according to claim 13, further comprising a water vapor supply module, the water vapor supply module being positioned at the upper end of the working chamber housing.

23. The device for pyrolysis of carbonaceous materials according to claim 13, the module for unloading pyrolysis products further comprising a mixing module.

24. The device for pyrolysis of carbonaceous materials according to claim 13, further comprising a thermocouple module installed in the first housing in the processing zone.

25. A method for pyrolysis of carbon-containing materials, the method comprising the steps of:

loading carbon-containing materials into a working chamber;

using first and second electrodes, heating the carbon-containing materials by passing electric current through the carbon-containing materials without air access;

wherein during the heating of the carbon-containing materials, a mechanical vibration is created due to a supply of acoustic vibrations at a resonant frequency of a working chamber volume;

collecting, cleaning and releasing gaseous pyrolysis products produced by the heating;

unloading solid pyrolysis products produced by the heating;

wherein the heating of the carbon-containing materials is carried out at a temperature not exceeding a melting point of the carbon-containing materials, while maintaining a gas permeability of the carbon-containing materials;

wherein the step of releasing the gaseous pyrolysis products is carried out after passing the gaseous pyrolysis products through a module for unloading pyrolysis products.

26. The method according to claim 25, wherein the pyrolysis occurs in a magnetic field.

27. The method according to claim 25, wherein a direct current is used to produce a current between the first and second electrodes.

28. The method according to claim 25, wherein an alternating current is used to produce a current between the first and second electrodes.

29. The method according to claim 25, wherein an alternating current with a frequency of 50-60 Hz is used to produce a current between the first and second electrodes.

30. The method according to claim 26, wherein during the heating of the carbon-containing materials, a second mechanical vibration is created due to an interaction of alternating current with the magnetic field.

31. The method according to claim 30, wherein during the heating of the carbon-containing materials a third mechanical vibration is created due to vibration of the first and second electrodes.

32. The method according to claim 25, wherein purification and neutralization of the gaseous pyrolysis products is carried out by passing the gaseous pyrolysis products through processed carbon-containing material.

33. The method according to claim 25, wherein a moisture content of the carbon-containing materials is regulated by supplying water vapor to a loading zone of the carbon-containing materials.

34. A method according to claim 25, wherein solid pyrolysis products are mixed in a pyrolysis product discharge zone.

\* \* \* \* \*